(12) United States Patent
Joshi et al.

(10) Patent No.: US 10,097,839 B2
(45) Date of Patent: Oct. 9, 2018

(54) PALETTE MODE FOR SUBSAMPLING FORMAT

(71) Applicant: QUALCOMM Incorporated, San Diego, CA (US)

(72) Inventors: Rajan Laxman Joshi, San Diego, CA (US); Vadim Seregin, San Diego, CA (US); Wei Pu, Pittsburgh, PA (US); Joel Sole Rojals, San Diego, CA (US); Marta Karczewicz, San Diego, CA (US); Feng Zou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 14/973,648

(22) Filed: Dec. 17, 2015

(65) Prior Publication Data

US 2016/0182913 A1   Jun. 23, 2016

Related U.S. Application Data

(60) Provisional application No. 62/094,737, filed on Dec. 19, 2014.

(51) Int. Cl.
*H04N 7/12* (2006.01)
*H04N 9/47* (2006.01)
(Continued)

(52) U.S. Cl.
CPC ......... *H04N 19/186* (2014.11); *H04N 19/124* (2014.11); *H04N 19/139* (2014.11); *H04N 19/176* (2014.11); *H04N 19/182* (2014.11); *H04N 19/45* (2014.11); *H04N 19/587* (2014.11); *H04N 19/59* (2014.11); *H04N 19/61* (2014.11); *H04N 19/80* (2014.11);
(Continued)

(58) Field of Classification Search
None
See application file for complete search history.

(56) References Cited

U.S. PATENT DOCUMENTS

| 7,343,037 B1 * | 3/2008 | Kadatch | H04N 1/644 |
| | | | 382/166 |
| 2011/0110416 A1 * | 5/2011 | Lawrence | G07F 17/32 |
| | | | 375/240.01 |

(Continued)

FOREIGN PATENT DOCUMENTS

WO   2015006724 A2   1/2015

OTHER PUBLICATIONS

Flynn, et al., "BoG report on Range Extensions topics", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-O0352-v5, Nov. 1, 2013, pp. 1-49, (uploaded in parts).
(Continued)

*Primary Examiner* — Talha M Nawaz
(74) *Attorney, Agent, or Firm* — Shumaker & Sieffert, P.A.

(57) ABSTRACT

Techniques are described to extend palette-mode coding techniques to cases where chroma components are at a different resolution than luma components. The entries of the palette table includes three color values and the three color values or a single one of the three color values are selected based on whether a pixel includes both a luma component and chroma components or only a luma component.

30 Claims, 10 Drawing Sheets

US 10,097,839 B2
Page 2

(51) Int. Cl.
    *H04N 7/18*     (2006.01)
    *H04N 19/186*     (2014.01)
    *H04N 19/124*     (2014.01)
    *H04N 19/139*     (2014.01)
    *H04N 19/176*     (2014.01)
    *H04N 19/44*     (2014.01)
    *H04N 19/587*     (2014.01)
    *H04N 19/59*     (2014.01)
    *H04N 19/61*     (2014.01)
    *H04N 19/80*     (2014.01)
    *H04N 19/96*     (2014.01)
    *H04N 19/182*     (2014.01)
    *H04N 19/90*     (2014.01)
    *H04N 19/93*     (2014.01)

(52) U.S. Cl.
    CPC ............. *H04N 19/90* (2014.11); *H04N 19/93* (2014.11); *H04N 19/96* (2014.11)

(56) References Cited

U.S. PATENT DOCUMENTS

| | | | |
|---|---|---|---|
| 2015/0016501 A1* | 1/2015 | Guo | ........................ G06T 9/00 375/240.02 |
| 2015/0373339 A1 | 12/2015 | Zou et al. | |
| 2015/0373340 A1 | 12/2015 | Zou et al. | |

OTHER PUBLICATIONS

Guo et al., "RCE4: Test 1. Major-color-based screen content coding", JCT-VC Meeting; Jan. 9-17, 2014; San Jose; (Joint Collaborative Team on Video coding of ISO/IEC JTC1/SC29/WG11 and ITU-TSG.I6); URL: http://wftp3.itu.int/av-arch/jctvc-site/, No. JCTVC-P0108, Jan. 4, 2014; 12 pp.
Guo, et al., "Evaluation of Palette Mode Coding on HM-12.0+RExt-4.1", JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-00218-v3, Oct. 23, 2013, XP030115268, 7 pp.
Guo L., et al., "RCE4: Results of Test 2 on Palette Mode for Screen Content Coding", JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-P0198, Jan. 4, 2014, XP030115730, 3 pp.
International Search Report and Written Opinion from International Application No. PCT/US2015/066763, dated Apr. 1, 2016, 16 pp.
Joshi, et al., "Screen Content Coding Test Model 4 Encoder Description (SCM4)," 20, JCT-VC Meeting; Feb. 10-18, 2015; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-T1014, Jun. 1, 2015; XP030117420, 12 pp.
Joshi, et al., "Non-CE1: Extension of Palette Mode to non-4:4:4 Formats," JCT-VC Meeting; Feb. 10-18, 2015; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-T0109, Jan. 31, 2015, XP030117251, 2 pp.
Sun, et al., "AHG10: A Triplet Palette Mode Combining JCTVC-P0108 and JCTVC-P0198", JCT-VC Meeting; Mar. 27-Apr. 4, 2014; Valencia; (Joint Collaborative Team on Video Coding of ISO/IEC JTC1/SC29/WG11 and ITU-T SG.16 ); URL:http://wftp3.itu.int/av-arch/jctvc-site/,, No. JCTVC-Q0083-v3, Mar. 27, 2014, XP030115988, 9 pp.
Xiu, et al., "Palette Coding Mode for Non-444 Screen Content Video," JCT-VC Meeting; Feb. 10-18, 2015; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-T0120, Jan. 31, 2015, XP030117268, 8 pp.
Ye, et al., "CE1-related: Palette Coding for non-444 Format Content," JCT-VC Meeting; Feb. 10-18, 2015; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-T0072, Jan. 31, 2015, XP030117201, 6 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Joshi, et al., "High Efficiency Video Coding (HEVC) Screen Content Coding: Draft 2," JCT-VC Meeting; Jun. 30-Jul. 9, 2014; (Joint Collaborative Team on Video Coding of ISO/IEC JTC1/SC29/WG11 and ITU-T SG.16 );No. JCTVC-S1005, Dec. 10, 2014; 380 pp.
Guo, et al., "Palette Mode for Screen Content Coding," JCT-VC Meeting; Apr. 18-26, 2013; (Joint Collaborative Team on Video Coding of ISO/IEC JTC1/SC29/WG11 and ITU-T SG.16 ); No. JCTVC-M0323, Apr. 20, 2013; 5 pp.
Guo, et al., "Non-RCE3: Modified Palette Mode for Screen Content Coding," JCT-VC Meeting; Jul. 25-Aug. 2, 2013; (Joint Collaborative Team on Video Coding of ISO/IEC JTC1/SC29/WG11 and ITU-T SG.16 ); No. JCTVC-N0249, Jul. 16, 2013; 6 pp.
Pu, et al., "Non-RCE4: Refinement of the Palette in RCE4 Test 2," JCT-VC Meeting; Jan. 9-17, 2014; (Joint collaborative Team on Video Coding of ISO/IEC JTC1/SC29/WG11 and ITU-T SG.16 ); No. JCTVC-P0231, Jan. 12, 2014; 4 pp.
Zou, et al., "Non-SCCE3: Copy from previous row mode for palette coding," JCT-VC Meeting; Jun. 30-Jul. 9, 2014; (Joint Collaborative Team on Video Coding of ISO/IEC JTC1/SC29/WG11 and ITU-T SG.16 ); No. JCTVC-R0202; Jul. 4, 2014, 3 pp.
Response to Written Opinion dated Apr. 1, 2016, from International Application No. PCT/US2015/066763, filed on Aug. 11, 2016, 7 pp.
Second Written Opinion from International Application No. PCT/US2015/066763, dated Nov. 28, 2016, 8 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH,

(56) References Cited

OTHER PUBLICATIONS

Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Flynn, et al., "High Efficiency Video Coding (HEVC) Range Extensions text specifications: Draft 7," JCT-VC Meeting; Mar. 27-Apr. 4, 2014, (Joint Collaborative Team on Video Coding of ISO/IEC JTC1/SC29/WG11 and ITU-T SG.16); No. JCTVC-Q1005_v4, Apr. 10, 2014; 379 pp.

Joshi, et al., "Non-CE1: Extension of palette mode to non-4:4:4 colour formats," JCT-VC Meeting; Feb. 10-18, 2015, Feb. 5, 2015, 2 pp.

Response to Second Written Opinion dated Nov. 28, 2016 from International Application No. PCT/US2015/066763, filed on Jan. 27, 2017, 27 pp.

International Preliminary Report on Patentability from correspoding PCT Application Serial No. PCT/US2015/066763 dated Mar. 30, 2017 (27 pages).

\* cited by examiner

Reference Palette

| Index | Pixel Value |
|---|---|
| 0 | $v_0$ |
| 1 | $v_1$ |
| 2 | $v_2$ |
| 3 | $v_3$ |
| 4 | $v_4$ |
| 5 | $v_5$ |

Current Palette

| Pred flag | Index | Pixel Value |
|---|---|---|
| 1 | 0 | $v_0$ |
| 0 | | |
| 1 | 1 | $v_2$ |
| 1 | 2 | $v_3$ |
| 1 | 3 | $v_4$ |
| 1 | 4 | $v_5$ |
| | 5 | $u_0$ |
| | 6 | $u_1$ |

FIG. 5

PALETTE MODE FOR SUBSAMPLING FORMAT

This application claims the benefit of U.S. Provisional Application No. 62/094,737 filed Dec. 19, 2014, the entire content of which is hereby incorporated by reference in its entirety.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes example techniques for palette-mode coding where the resolution of the chroma components is less than that of the luma component. The entries of the palette table include three color values, one for each of the luma component and two chroma components. If a pixel of a block has the luma component and the two chroma components, then all three color values are used for the palette-mode coding of the pixel. However, if a pixel of a block only has a luma component and no chroma components, then only a single color value (e.g., the first of the three color values) is used for the palette-mode coding of the pixel.

In one example, the disclosure describes a method of decoding video data, the method comprising deriving a single palette table, for a current block of the video data, that includes entries having three color values, determining whether a pixel in a current block of the video data includes a luma component and chroma components, determining a number of color values to retrieve from the single palette table based on the determination of whether the pixel in the current block includes the luma component and the chroma components, and palette-mode decoding the pixel in the current block of the video data based on the determination of the number of color values to retrieve.

In one example, the disclosure describes a device for decoding video data, the device comprising a memory unit configured to store a palette table, for a current block of the video data, that includes entries having three color values, and a video decoder configured to derive the palette table for the current block of the video data, and no other palette table for the current block, for storage in the memory unit, determine whether a pixel in the current block of the video data includes a luma component and chroma components, determine a number of color values to retrieve from the palette table based on the determination of whether the pixel in the current block includes the luma component and the chroma components, and palette-mode decode the pixel in the current block of the video data based on the determination of the number of color values to retrieve.

In one example, the disclosure describes a non-transitory computer-readable storage medium having instructions stored thereon that when executed cause one or more processors of device for decoding video data to derive a single palette table, for a current block of the video data, that includes entries having three color values, determine whether a pixel in the current block of the video data includes a luma component and chroma components, determine a number of color values to retrieve from the single palette table based on the determination of whether the pixel in the current block includes the luma component and the chroma components, and palette-mode decode the pixel in the current block of the video data based on the determination of the number of color values to retrieve.

In one example, the disclosure describes a device for decoding video data, the device comprising means for deriving a single palette table, for a current block of the video data, that includes entries having three color values, means for determining whether a pixel in a current block of the video data includes a luma component and chroma components, means for determining a number of color values to retrieve from the single palette table based on the determination of whether the pixel in the current block includes the luma component and the chroma components, and means for palette-mode decoding the pixel in the current block of the video data based on the determination of the number of color values to retrieve.

In one example, the disclosure describes a method of encoding video data, the method comprising determining that a pixel in a current block of the video data is not to be encoded based on a single palette table, determining whether the pixel in the current block of the video data includes a luma component and chroma components, determining a number of color values to signal in a bitstream based on the determination of whether the pixel in the current block includes the luma component and the chroma components, and signaling color values for the pixel in the bitstream, used for reconstructing the current block, based on the determined number of color values.

In one example, the disclosure describes a device for encoding video data, the device comprising a memory unit configured to store a palette table, for a current block of the video data, and a video encoder configured to determine that a pixel in the current block of the video data is not to be encoded based on the palette table, determine whether the pixel in the current block of the video data includes a luma component and chroma components, determine a number of color values to signal in a bitstream based on the determination of whether the pixel in the current block includes the luma component and the chroma components, and signal color values for the pixel in the bitstream, used for reconstructing the current block, based on the determined number of color values.

The details of one or more examples are set forth in the accompanying drawings and the description below. Other features, objects, and advantages will be apparent from the description and drawings, and from the claims.

BRIEF DESCRIPTION OF DRAWINGS

FIG. 5 illustrates an example of palette prediction.

DETAILED DESCRIPTION

Figure 1:
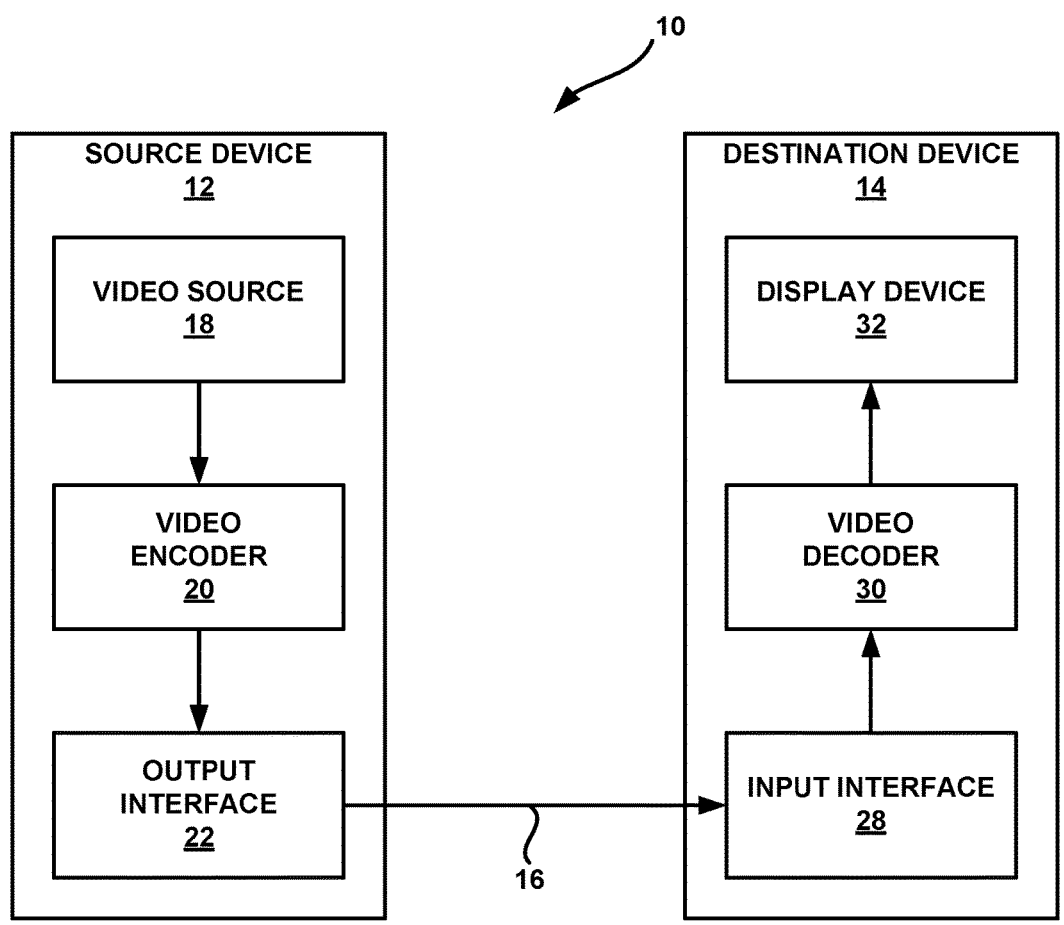
FIG. 1 is a block diagram illustrating an example video coding system that may utilize the techniques described in this disclosure.

This disclosure describes techniques for video coding and compression. In particular, this disclosure describes techniques for palette-based video coding of video data. In palette-based video coding, a video coder (e.g., video encoder or video decoder) derives a palette table for a block of pixels, where each entry in the palette table includes color values that are identified by indices into the palette table. For cases where palette-mode coding techniques are applied to 4:4:4 sampling format, for each pixel in the block there are three color values: one luma component and two chroma components. Accordingly, each entry in the palette table includes three color values.

However, coding efficiencies may be gained with palette-mode coding techniques that use non-4:4:4 sampling format. In non-4:4:4 sampling format, the chroma components may be subsampled relative to the luma component such as in the 4:2:2 or 4:2:0 sampling format. Therefore, for non-4:4:4 sampling format, some pixels in a block of video data include all three color values: luma component and two chroma components, and some pixels in the block of video data include only a single color value: luma component.

The techniques described in this disclosure describe ways to use palette-mode coding for non-4:4:4 sampling formats. For a non-4:4:4 sampling format, the video coder derives a palette table and each entry in the palette table includes three color values. However, whether all three color values or a single color value of the three color values is retrieved is based on whether a pixel in the block of video data includes all three color values or a single color value. If the pixel includes only a single color, then a single color value is retrieved. If the pixel includes all three colors, the all three color values are retrieved.

In some examples, the palette-based coding techniques may be configured for use with one or more video coding standards. Recently, the design of a new video coding standard, namely High-Efficiency Video Coding (HEVC) "ITU-T H.265, Series H: Audiovisual and Multimedia Systems, Infrastructure of audiovisual services—Coding of moving video, High efficiency video coding," The International Telecommunication Union, October 2014, has been finalized by the Joint Collaboration Team on Video Coding (JCT-VC) of ITU-T Video Coding Experts Group (VCEG) and ISO/IEC Motion Picture Experts Group (MPEG). The latest HEVC specification, referred to as HEVC Version 1, is available from http://www.itu.int/rec/T-REC-H.265-201304-I. The Range Extensions to HEVC, namely HEVC-Rext, are also being developed by the JCT-VC. A recent Working Draft (WD) of Range extensions, referred to as RExt WD7, is available from http://phenix.int-evey.fr/jct/doc_end_user/documents/17_Valencia/wg11/JCTVC-Q1005-v4.zip. Recently, JCT-VC has started the development of screen content coding (SCC), which is based on the HEVC-Rext. A working draft for screen content coding (SCC) is provided in "High Efficiency Video Coding (HEVC) Screen Content Coding: Draft 2," JCTVC-S1005, to Joshi et. al, Joint Collaborative Team on Video Coding (JCT-VC) of ITU-T SG 16 WP 3 and ISO/IEC JTC 1/SC 29/WG 11 and is available from http://phenix.int-evey.fr/jct/doc_end_user/current document.php?id=9793.

The techniques described in this disclosure are related to screen content coding (SCC), with for example, HEVC extensions or other screen content related video codec. Popular international video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264 (also known as ISO/IEC MPEG-4 AVC), High-Efficiency Video Coding (HEVC), etc. As described above, the screen content coding extension to HEVC, named as SCC, is being developed. As also noted above, a recent Working Draft (WD) of SCC including palette mode description is available in JCTVC-S1005 "High Efficiency Video Coding (HEVC) Screen Content Coding: Draft 2" Joint Collaborative Team on Video Coding (JCT-VC) of ITU-T SG16 WP3 and ISO/IEC JTC 1/SC29/WG11 18th meeting: Sapporo, JP, 30 Jun.-9 Jul. 2014.

In traditional video coding, images are assumed to be natural images that are continuous-tone and spatially smooth. Based on these assumptions, various tools have been developed such as block-based transform, filtering, etc., and such tools have shown good performance for natural content videos. However, in applications like remote desktop, collaborative work and wireless display, computer generated screen content may be the dominant content to be compressed. This type of content tends to have discrete-tone and feature sharp lines and high contrast object boundaries. The assumption of continuous-tone and smoothness may no longer apply, and thus, traditional video coding techniques may be inefficient ways to compress the content.

This disclosure describes palette-based coding, which may be particularly suitable for screen generated content coding. For example, assume a particular area of video data has a relatively small number of colors. A video coder (a video encoder or video decoder) may code a so-called "palette" as a table of colors for representing the video data of the particular area (e.g., a given block). Each pixel may be associated with an entry in the palette that represents the color of the pixel (e.g., luma and chroma or just luma, as described in more detail below). For example, the video coder may code an index that relates the pixel value to the appropriate value in the palette. As described herein, a palette entry index may be referred as a palette index or simply index. Thus, in palette mode, a palette may include entries numbered by an index representing color values that may be used as predictors for block samples or as final reconstructed block samples. Each entry in the palette may contain one color component (e.g., a luma value), two color components (e.g., two chroma values), or three color components (e.g., RGB, YUV, or the like), depending on the particular color format being used. As described in this disclosure, the palette (also called palette table) includes three color components for each entry, but whether one or all three color components are retrieved is based on whether a pixel includes only a luma component or a combination of a luma component and chroma components.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Using a palette coding mode, a video encoder may encode a block of video data by determining a palette for the block, locating an entry in the palette to represent the value of each pixel, and encoding the palette with index values for the pixels relating the pixel value to the palette. A video decoder may obtain, from an encoded bitstream, a palette for a block, as well as index values for the pixels of the block. The video decoder may relate the index values of the pixels to entries of the palette to reconstruct the pixel values of the block. For example, entries of the palette with a palette index may be used to determine values or "samples" of one or more pixel components of the block. The example above is intended to provide a general description of palette-based coding.

This disclosure uses the term "signal" or "signaling" to indicate a way in which a video encoder provides information to a video decoder. Signaling of syntax elements (or other types of data) should not be construed to mean that the video decoder immediately receives the signaled information from the video encoder; however, that may be possible. In some examples, a video encoder may signal information (e.g., syntax elements or other video data) that is stored in a storage device. A video decoder may then retrieve the information at a later time from the storage device.

In the palette mode, every pixel of the block can be coded with COPY_INDEX_MODE, COPY_ABOVE_MODE, or ESCAPE mode, except for maybe the very first row of the block when only COPY_INDEX_MODE or ESCAPE modes are possible. The syntax element palette_run_type_flag indicates whether COPY_INDEX_MODE or COPY_ABOVE_MODE is used. In copy index mode, (i.e., palette_run_type_flag is equal to COPY_INDEX_MODE), palette index (i.e., syntax element palette_index) is signaled followed by the palette run value palette_run. The run value indicates the number of subsequent pixels that will have the same palette index. In COPY_ABOVE_MODE, only run value may be signaled indicating the number of subsequent pixels for which the palette index is copied from the pixel located directly above the current pixel. ESCAPE mode is coded within the COPY_INDEX_MODE or COPY_ABOVE_MODE where a specific palette index is used to indicate this mode. In the current palette version, this index is equal to the palette size. In the ESCAPE mode, a pixel triplet (YCbCr or RGB) or its quantized version is signaled as palette_escape_val.

A flag palette_escape_val_present_flag is signaled per block to indicate the usage of the escape pixels. This flag being equal to 1 indicates that there is at least one escape pixel in the palette coded block, and the flag is equal to 0 otherwise.

Palette size is restricted to be in the range of 0 to max_palette size. The maximum size can be signaled.

For the block coded with the palette mode, the palette can be predicted from the palette entries of the previously palette coded blocks, can be explicitly signaled as new entries, or the palette of the previously coded block can be completely reused. The latter case is called palette sharing and a flag palette_share_flag is signaled to indicate that the entire palette of the previous block is reused without modification as is.

In the palette mode, the pixel scanning in the block can be of two types: vertical traverse or horizontal traverse (snakelike) scanning. The scanning pattern used in the block is derived according to the flag palette_transpose_flag signaled per block unit.

In the coding modes described above, a "run" of values may generally refer to a string of pixel values that are coded together. A run may generally be described with respect to the number of elements included in the run and that are processed or coded together as a group (e.g., the run length). In some examples, a run may include like-valued pixel values. For example, a run in the Index mode may indicate a string of values having the same index value (as noted above). In an example for purposes of illustration, if two consecutive pixels in a given scan order have different values, the run length is equal to zero. If two consecutive pixels in a given scan order have the same value but the third pixel in the scan order has a different value, the run length is equal to one, and so on.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to code pixels of a block where the chroma components are subsampled relative to the luma components.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Version 1. In addition to the base HEVC standard (HEVC Version 1), there are ongoing efforts to produce scalable video coding, multiview video coding, and 3D coding extensions for HEVC. In addition, palette-based coding modes (e.g., as described in this disclosure), may be provided for extension of the HEVC standard (e.g., the screen content coding extension to HEVC). In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three components representative of three respective sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate (e.g., determine) the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate (e.g., determine) the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma samplein one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU s predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than or in addition to performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate entry in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples, video encoder 20 and video decoder 30 may perform line copying for one or more entries of a map. For example, video encoder 20 may indicate that a pixel value for a particular entry in a map is equal to an entry in a line above the particular entry. Video encoder 20 may also indicate, as a run, the number of indices in the scan order that are equal to the entry in the line above of the particular entry. In this example, video encoder 20 and/or video decoder 30 may copy index values from the specified neighboring line and from the specified number of entries for the line of the index map currently being coded.

According to aspects of this disclosure, video encoder 20 and video decoder 30 may perform any combination of the techniques for palette coding described below with respect to FIGS. 4-7 or described otherwise in this disclosure. In other words, the examples described with respect to FIGS. 4-7 should not be considered limiting or otherwise required by the techniques described in this disclosure.

This disclosure describes example techniques to code a current block in palette-mode. In this disclosure, the term "current block" is used to commonly refer to the luma block having the luma components and the two chroma blocks having respective chroma components. One example of the "current block," as used in this disclosure is the above defined coding unit (CU). The HEVC standard defines the CU as follows: a coding block of luma samples, two corresponding coding blocks of chroma samples of a picture that has three sample arrays, or a coding block of samples of a monochrome picture or a picture that is coded using three separate color planes and syntax structures used to code the samples.

As described above, there is a current working draft for screen content coding (SCC). In the current SCC working draft, JCTVC-S1005, the palette mode is defined for 4:4:4 chroma subsampling format only, where the luma and chroma block sizes are equal. To improve coding efficiency, it may be desirable to design the palette mode for non-4:4:4 chroma subsampling formats, such as 4:2:0 or 4:2:2, where the chroma sample block is generally smaller than the luma sample block. For example, for 4:2:0 chroma subsampling format and 8×8 block, the luma sample block size is 8×8 while the corresponding chroma sample block size is 4×4 (e.g., both the vertical and horizontal chroma are halved). For 4:2:2 chroma subsampling format and 8×8, luma sample block size is 8×8 while the corresponding chroma sample block size is 4×8 (e.g., the horizontal chroma is halved). As an example, assume that the current block that is palette-mode coded is a CU of size 8×8. For this 8×8 sized CU, there is one 8×8 sized luma block, and two 4×8 chroma blocks for 4:2:2 subsampling format or two 4×4 chroma blocks for 4:2:0 subsampling.

This disclosure describes several techniques to design the palette mode for non-4:4:4 chroma subsampling format. These techniques can be divided into several parts, where each part can be applied separately or in any combination with the others. Each part can represent the modification that can be done with respect to the current palette mode design, and the aspects of the palette mode that are not mentioned in the disclosure can be assumed, but not limited, to be the same as in the 4:4:4 palette mode.

For palette table derivation, in the 4:4:4 palette mode, each palette entry consists of a color triplet, for example Y, $C_b$, and $C_r$. For every non-escape pixel in the block, a palette index is assigned to it, which points to an entry in the palette table. The corresponding color triplet may be used for reconstruction. However, in non-4:4:4 case, the number of luma samples (luma components) may be greater than the number of chroma samples (chroma components), and every pixel in the block may not have three color components.

In some examples, video encoder 20 and video decoder 30 may each derive a palette table. As used in this disclosure, the phrase "derive a palette table" or its equivalent refers to any way in which video encoder 20 or video decoder 30 determines values for a palette table. For instance, from the perspective of video encoder 20, video encoder 20 may determine values for the palette table based on color values of the block being encoded. From the perspective of video decoder 30, video decoder 30 may determine values for the palette table based on information contained in the received bitstream. In both of these examples, video encoder 20 may be considered as deriving the palette table and video decoder 30 may be considered as deriving the palette table. Other ways to determine the values of the palette table are possible, and are considered to be encompassed by the phrase "derive a palette table" or its equivalent.

This same palette table includes color values for luma samples and chroma samples. In this disclosure the terms color values and color components are used interchangeably. Each entry in the palette table includes three color components (e.g., three color values): a first color component for the luma sample, a second color component for a first chroma component, and a third color component for a second chroma component.

When video decoder 30 is to decode a current block coded in palette mode (e.g., reconstruct the current block based on the palette table), video decoder 30 may utilize this single palette table to reconstruct the current block. For instance, video decoder 30 may utilize this single palette table, and no other palette table, to reconstruct the luma block and the two chroma blocks of this current block using this palette table that includes color values (e.g., color components) for the luma component of the luma block and the two chroma components for respective chroma blocks.

For an N×N sized CU (e.g., N×N sized current block), there is a corresponding N×N luma block having luma components. Accordingly, there is one corresponding luma sample for each pixel in the CU. However, for subsampling, there is not one corresponding chroma sample for each pixel in the CU. For instance, for 4:2:2 sub sampling, the corresponding chroma blocks have N/2×N chroma samples, and therefore, for every two pixels in the CU, there is one corresponding sample in respective chroma blocks. For 4:2:0 subsampling, the corresponding chroma blocks have N/2×N/2 chroma samples, and therefore, for every four pixels in the CU, there is one corresponding sample in respective chroma blocks.

In some examples, for each pixel of the current block (e.g., CU), video decoder 30 may determine whether a pixel of the current block includes corresponding luma and chroma components or just a corresponding luma component. Based on the determination of whether the pixel of the current block includes the luma component and the chroma components, video decoder 30 may determine a number of color values to retrieve from the palette table. For example, if video decoder 30 determines that a pixel of the current block includes a luma component and chroma components, video decoder 30 may retrieve all three color values from the palette table. If, however, video decoder 30 determines that a pixel of the current block includes a luma component and no chroma components, video decoder 30 may retrieve one, and not all three, of the three color values from the palette table (e.g., the first of the three color values).

Video decoder 30 may palette-mode decode the pixel in the current block based on the determination of the number of color values to retrieve. For example, video decoder 30 may receive a single index identifying one entry into the palette table. If video decoder 30 determined that three color values are to be retrieved, video decoder 30 may retrieve all three color values from the identified entry into the palette table and assign each respective color value to the corresponding sample in the luma block and the corresponding samples in respective chroma blocks. If video decoder 30 determined that one color value is to be retrieved, video decoder 30 may retrieve one color value of the three color values from the identified entry into the palette table and assign that color value to the corresponding sample in the luma block.

In accordance with the above example, for subsampling formats, video decoder 30 may be able to reconstruct pixels of the current block (e.g., reconstruct luma samples and chroma samples of respective luma and chroma blocks corresponding to the CU) without needing substantial changes to the video decoding process as compared to non-subsampling formats. For instance, for 4:4:4 sampling format, for every pixel in the current block (e.g., CU), there is a corresponding sample in the luma block and the two chroma blocks. For such 4:4:4 sampling format, video encoder 20 signals a single index in the single palette table, and video decoder 30 retrieves all three color values based on the entry in the palette table identified by the index and assigns each of the luma and chroma samples the respective color values.

For the subsampling format, video decoder 30 may derive a single palette table and receive a signal entry into this palette table, similar to the non-subsampling format. However, the number of color values that video decoder 30 retrieves may be different for different pixels of the current block. In this way, the bitstream that video encoder 20 signals for the 4:4:4 sampling format and for the subsampling formats is the same, but video decoder 30 may selectively retrieve different number of color values based on a determination of whether a pixel in the current block includes a luma component and chroma components or a luma component and no chroma components.

Although the bitstream for subsampling formats may not need to change relative to non-subsampling formats when palette-mode coding a pixel based on an entry in the palette table, for an escape pixel, the bitstream for subsampling formats may be different than those for the non-subsampling formats. An escape pixel is a pixel for which the color values are not in the derived palette table. For an escape pixel, video encoder 20 explicitly signals the color values (possibly quantized) for the luma and chroma components.

For non-subsampling formats, for an escape pixel, video encoder 20 may signal and video decoder 30 may receive color values for each of the corresponding luma and chroma samples in respective luma and chroma blocks. For subsampling formats, in some examples, video encoder 20 may signal only one color value for an escape pixel for which there is only a luma component and signal all three color values for an escape pixel for which there is a luma component and both chroma components. In these examples, video decoder 30 may determine a number of color values to parse from the bitstream based on a determination of whether an escape pixel of the current block includes the luma components and the chroma components. Video decoder 30 may then decode the pixel (e.g., reconstruct the pixel) based on the determination of the number of color values to parse from the bitstream.

The above example techniques may be summarized as follows. These example techniques are described from the decoder perspective (i.e., perspective of video decoder 30) for 4:2:2 and 4:2:0 palette blocks. In this case, each palette entry consists of the color components (i.e., three color values). For each pixel in the block (e.g., CU), an index is determined (e.g., either by decoding or may be part of a copy index or copy above run). The bitstream syntax is similar to the syntax in 4:4:4 case. If the pixel consists of both luma and chroma components, and the pixel index does not indicate an ESCAPE pixel, all three color components of the corresponding palette entry are used for prediction or reconstruction. If the pixel consists of only the luma component, and the pixel index does not indicate an ESCAPE pixel, only the first color component of the corresponding palette entry is used for prediction or reconstruction. In case of ESCAPE pixels, if the pixel consists of only luma component, a single component value (possibly quantized) is read from the bit-stream. Similarly, if an ESCAPE pixel consists of luma as well as chroma components, three component values (possibly quantized) are read from the bitstream.

In the above example, video decoder 30 may determine how many color values to read from the palette table or how many color values to parse from the bitstream based on a determination of whether a pixel includes luma and chroma components or a luma component and no chroma components. There may be various ways in which video decoder 30 may determine whether a pixel includes luma and chroma components or a luma component and no chroma components, and the techniques described in this disclosure are not limited to any one such technique. As one example way, video decoder 30 may determine whether a pixel includes luma and chroma components or a luma component and no chroma components based on a phase alignment.

Figure 8:
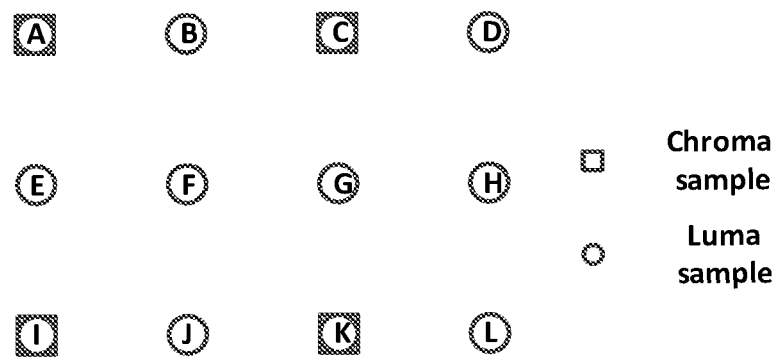
FIG. 8 is a conceptual diagram illustrating an example of a 4:2:0 chroma subsampling format for a phase aligned case.
Figure 9:
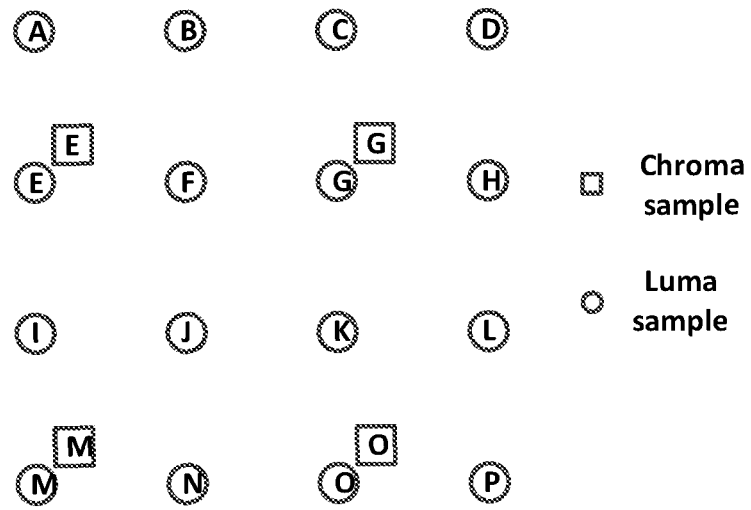
FIG. 9 is a conceptual diagram illustrating an example of a 4:2:0 chroma subsampling format for a phase misaligned case.

Phase alignment, as described in more detail with respect to FIGS. 8 and 9, generally refers to the association between luma components and chroma components of the current block. For example, for 4:2:0 subsampling, for a group of four pixels (e.g., 2×2 sub-block of pixels) in a CU, there is a corresponding group of 2×2 sub-block of samples in the luma block, and only one sample in the respective chroma blocks. Therefore, the one sample in the respective chroma blocks may correspond to any one of the four pixels in the 2×2 sub-block of the luma block (e.g., one chroma component corresponds to four luma components).

For example, for a 2×2 sub-block in the CU, there is a top-left, top-right, bottom-left, and bottom-right pixel. The phase alignment indicates whether the sample in the chroma block corresponds to the top-left, top-right, bottom-left, or bottom-right pixel in the 2×2 sub-block in the CU, which is the same sub-block in the luma block. Video decoder 30 may utilize the phase alignment to determine whether a pixel includes luma and chroma components or a luma component and no chroma components. This phase alignment is used only for coding purposes. The actual physical location of the chroma samples may be different than that indicated by the phase alignment. The chroma location may be aligned to even fractional pixel position.

For example, assume that a sample in the chroma blocks is aligned with the top-left pixel of the 2×2 sub-block of the CU. In this example, the phase alignment between luma components of the current block and the chroma components of the current block indicates that the top-left sample of the 2×2 sub-block in the luma block is associated with a sample in the chroma block. When video decoder 30 is palette-mode decoding the top-left pixel of the 2×2 sub-block, video decoder 30 may determine that all three color values from the palette table are to be retrieved or determine that all three color values from the bitstream are to be parsed for an escape pixel. For the top-right, bottom-right, and bottom-left pixels of the 2×2 sub-block of the CU, video decoder 30 may determine that only one color value from the palette table is to be retrieved or determine that only one color value from the bitstream is to be parsed for an escape pixel.

Although the above example describes phase alignment with the top-left pixel of a 2×2 sub-block, the techniques described in this disclosure are not so limited, and the phase alignment may be for the top-right, bottom-right, or bottom-left pixel of the 2×2 sub-block. More generally, for the 4:2:0 sub sampling, one phase alignment may be that every pixel in the current block having an even x-coordinate and an even y-coordinate is phase aligned with the chroma blocks (e.g., phase alignment between luma components and chroma components of the current block indicates that samples having even x-coordinates and even y-coordinates in the luma block correspond to a sample in the chroma blocks). Another phase alignment may be that every pixel in the current block having an even x-coordinate and an odd y-coordinate is phase aligned with the chroma blocks (e.g., phase alignment between luma components and chroma components of the current block indicates that samples having even x-coordinates and odd y-coordinates in the luma block correspond to a sample in the chroma blocks). Another phase alignment may be that every pixel in the current block having an odd x-coordinate and an even y-coordinate is phase aligned with the chroma blocks (e.g., phase alignment between luma components and chroma components of the current block indicates that samples having odd x-coordinates and even y-coordinates in the luma block correspond to a sample in the chroma blocks). Another phase alignment may be that every pixel in the current block having an odd x-coordinate and an odd y-coordinate is phase aligned with the chroma blocks (e.g., phase alignment between luma components and chroma components of the current block indicates that samples having odd x-coordinates and odd y-coordinates in the luma block correspond to a sample in the chroma blocks).

The phase alignment for the 4:2:2 may be similar, except there are two pixels in the current block for every one sample in the chroma blocks. For the 4:2:2 case, one phase alignment may be that every pixel in the current block having an even x-coordinate is phase aligned with the chroma blocks (e.g., phase alignment between luma components and chroma components of the current block indicates that samples having even x-coordinates in the luma block correspond to a sample in the chroma blocks). Another phase alignment may be that every pixel in the current block having an odd x-coordinate is phase aligned with the chroma blocks (e.g., phase alignment between luma components and chroma components of the current block indicates that samples having odd x-coordinates in the luma block correspond to a sample in the chroma blocks). The value of the y-coordinate in the 4:2:2 subsampling format may not be relevant since only the horizontal portion is half sampled and the vertical portion is the same.

The particular phase alignment for a picture may be preset. As another example, video encoder 20 may signal information indicating the phase alignment (e.g., a two-bit value for 4:2:0 subsampling as there are four possible phase alignments, or a one-bit value for 4:2:2 subsampling as there are two possible phase alignments). Video decoder 30 may determine the phase alignment based on the signal information indicating the phase alignment. As another example, video encoder 20 and video decoder 30 may implicitly determine the phase alignment based on other factors such as content of neighboring blocks, phase alignment of previous block, etc. so that video encoder 20 does not need to explicitly indicate the phase alignment and the phase alignment does not need to be preset.

In this way, video decoder 30 may determine a phase alignment between luma components of the current block and chroma components of the current block. To determine whether the pixel in the current block includes the luma component and the chroma components, video decoder 30 may determine whether the pixel in the current block includes the luma component and the chroma components based on the determined phase alignment.

The above describes one example for palette-mode decoding using a single palette table and determining whether all three color values or only one color value should be retrieved from the palette table entry based on the phase alignment of the luma components of the current block and the chroma components of the current block. The above also describes examples of determining whether three color values or one color value is to be parsed from the bitstream for an escape pixel based on the phase alignment of the luma components of the current block and chroma components of the current block.

However, the example techniques described in this disclosure are not so limited. The following describes additional examples and reiterates some of the examples described above. The following techniques may be used in conjunction with above or separately from above, as applicable.

In some examples, rather than having a single palette table, multiple palette tables may be used (e.g., one palette with all three colors, one palette for luma components, and another palette for chroma components). Palette table derivation can be changed to account for this difference by allowing palette entries having less than three color components, for example, the palette entry may be a color triplet (e.g., Y, U, V), color pair (e.g. U, V) or a single color (e.g.

Y), or any other color combination. Video encoder 20 may indicate the palette entry type, or the number of color components included into the palette entry, for example, using 0 triplet, 10 pair, and 11 single entry or other means. According to this indication, if a new palette entry is signaled, video encoder 20 may only signal the corresponding color components. For example, if the entry is a pair, then only two new color components are signaled as a new palette entry.

In a more specific case, the palette entries can be only of two types: triplet and single component, and video encoder 20 may signal a one bit flag to indicate the entry type. Some example techniques are described for this specific case, but the more general approach (using more than a triplet or single entry) should be considered within the scope of this disclosure.

Similar entries, such as triplet, pair, or single component, can be used in the palette predictor list. Alternatively or additionally, the palette predictor list can always consist of the triplets. Pairs and single component entries can be predicted from the triplet by may be using only the corresponding colors. For example, if a single component entry is predicted from a triplet (A, B, C), then the single component palette entry's corresponding component value is equal to A. This example is also applicable to the above example of using a single palette as a way to derive the single palette (e.g., using a palette predictor list).

In some examples, separate palettes and palette predictor lists are maintained for triplets and single component palette entries. In this case, video encoder 20 may signal the palette predictor reuse flags and new palette entries separately for the triplets and single component palette entries, respectively.

A palette index may be used to indicate the palette entry used to predict (or represent) a pixel in the block, and the color(s) associated with the palette entry may be assigned to the pixel at the video decoder 30 stage.

For palette indexing, alternatively or additionally to the above description for palette table derivation, palette entries may only consist of triplets, even though not all the colors in the palette entry may be used to predict a particular pixel in the block. In the techniques described in this disclosure, video encoder 20 and video decoder 30 may derive the number of colors, necessary to predict (represent) a certain pixel, according to the pixel position within the block and chroma color format (e.g., the phase alignment). For example, in 4:2:0 chroma color format, four luma samples have one corresponding chroma pair (U and V), i.e., every second row and every second column may have a pixel having three color components and all the other pixels will have only luma component. Thus, in one example, the chroma samples may be present when both the row and column indices are even. A different alignment of the luma samples with chroma samples is possible as well. So, the palette index may initially indicate three color components in the palette table. If the particular pixel position has only luma samples, only the first color component of the triplet may be used to predict (represent) the pixel.

In the same way, for a group of pixels coded with COPY_INDEX_MODE or COPY_ABOVE_MODE, the number of color components to copy may be derived based on pixel position and chroma color format. The run value of the palette mode may indicate the length of the luma pixels series within the mode (not all luma samples have corresponding chroma sample), or the length of the more complete color component in general.

If a pixel is an ESCAPE pixel (i.e., the color values are explicitly signaled), the number of colors to be signaled may be derived based upon the pixel position and chroma color format. Thus, if the pixel position has no chroma samples, only the luminance value is coded for the escape pixel.

The palette table can be derived by taking into account that the number of luma samples is 4 times as much as the number of chroma samples and more weight, in terms of accuracy, may be assigned to luma component. However, if there is a need to have only one method of palette derivation, the palette table can be derived by using 4:4:4 palette derivation method by subsampling the luma component to match the chroma pixels or by upsampling the chroma components to match the number of luma samples.

For a color specific palette and palette predictor, when pixels have a different number of associated color components, separate palette tables may be maintained for different types of palette entries. For example, two palette tables having triplet only entries and single entries may be used. The number of palette components to be used for a certain pixel may be derived according to the pixel position and chroma color format, and the color components may be selected from the derived palette table type according to the palette index. The run value may correspond to the longer color component which is typically luma.

For example, if a group of pixels are coded with COPY_INDEX_MODE, video encoder 20 may signal and video decoder 30 may receive the palette index and run value. For every luma pixel within the signaled run value, video decoder 30 may derive the number of color components associated with a pixel first (i.e., whether it is a triplet or single entry). Then, video decoder 30 may select the appropriate number of color(s) from the corresponding palette table.

Palette predictor can be triplet-based only, or can be separated according to the palette entry types and maintained separately. If palette predictor consists of triplets only and when the palette entry is predicted from the palette predictor, then only needed colors are copied.

Alternatively or additionally, the palette table can be separated according to the pixel types (e.g., triplet or single entry), but the table may still have triplets and only needed colors may be used according to the pixel type. In this case, the common palette predictor can be simply composed of all used entries, since all entries are triplet based.

For wavefront synchronization, if wavefront parallel processing (WPP) is enabled, palette predictor and palette size of the last palette-coded block are stored at the end of every second coding tree unit (CTU) in a CTU row for the next CTU row synchronization purpose. If palette or palette predictor is separated according to the entry types, then each type of the palette predictor and/or each type of the palette size of the last palette-coded block may be needed to be stored for WPP synchronization.

The following describes some example aspects to further assist with understanding. These examples may be applied separately or together in any combination. One example technique is that described above where each palette entry includes three color values, and video decoder 30 determines a number of color values to retrieve based on whether a pixel in the current block includes luma and chroma components or luma components and no chroma components. Video decoder 30 may also determine a number of color values to parse from the bitstream for an escape pixel based on whether the pixel in the current block includes luma and chroma components.

As described above, video encoder 20 and video decoder 30 may use phase alignment information to determine whether a pixel includes luma and chroma components or a luma component and no chroma components. Video encoder 20 may signal and video decoder 30 may receive the phase alignment information in a parameter set (e.g., the sequence parameter set (SPS) or picture parameter set (PPS)), a slice header, or video usability information (VUI) can be used to convey the phase alignment. For instance, if only triplet is used in the palette table, it is proposed to use a syntax element in SPS or PPS or slice header to indicate different phase alignments. Alternatively or additionally, VUI can be used to convey such information.

For example, in FIG. 8, luma pixel positions A, C, I, and K are considered to have three color components (e.g., luma and two chroma components) and the rest of the luma pixel positions are considered to have a single color component (e.g., luma component and no chroma component). In another example, as illustrated in FIG. 9, luma pixel positions in location E, G, M, and O are considered to have three color components (e.g., luma and two chroma components) while the rest of the luma pixel positions are considered to have single color components (e.g., luma component and no chroma component).

Therefore, a syntax element is proposed to indicate such difference cases (e.g., a syntax element to indicate the phase alignment). For example, when the element equals to '00', luma pixel positions A, C, I, K are used to derive chroma pixel values. When the element equals to '01', luma pixel positions B, D, J, L are used to derive chroma pixel values. When the element equals to '10', luma pixel positions E, G, M, O are used to derive chroma pixel values. When the element equals to '11', luma pixel positions F, H, N, P are used to derive chroma pixel values.

In the above example, only one luma position is used to derive the chroma pixel value. However, the techniques described in this disclosure are not so limited. In another example, video encoder 20 and video decoder 30 may use more than one luma position to derive the chroma pixel value. For example, in FIG. 9, after video encoder 20 or video decoder 30 gets the index for luma position A, B, E, F, these index values can be mapped into four color triplet using the palette table. Therefore, there are four chroma pairs (e.g., two chroma color values for luma position A, two chroma color values for luma position B, two chroma color values for luma position E, and two chroma color values for luma position F).

In one example, video encoder 20 and video decoder 30 may use the average values of these four chroma pairs as the reconstructed chroma pixel values. Alternatively or additionally, video encoder 20 and video decoder 30 may select two or three chroma pairs, and use their average as the reconstructed chroma pixel values. Alternatively or additionally, video encoder 20 and video decoder 30 may use these four chroma pairs into a 4-tap filter and use the filtered pixel value as the reconstructed chroma pixel values.

In another example, in 4:4:4 palette mode, for the COPY_ABOVE_MODE, the current pixel shares the same color triplet as its above neighbor pixel. In non-4:4:4 mode, for a pixel position that has all three components, for copying the chroma components, video encoder 20 and video decoder 30 may copy the chroma components from the closest position above the current pixel position, which has all three components.

For example, in FIG. 8, if luma position K is in copy above mode, instead of copying the index from G and getting the corresponding chroma component values by looking up the palette table, video decoder 30 copies position C's chroma components.

Figure 2:
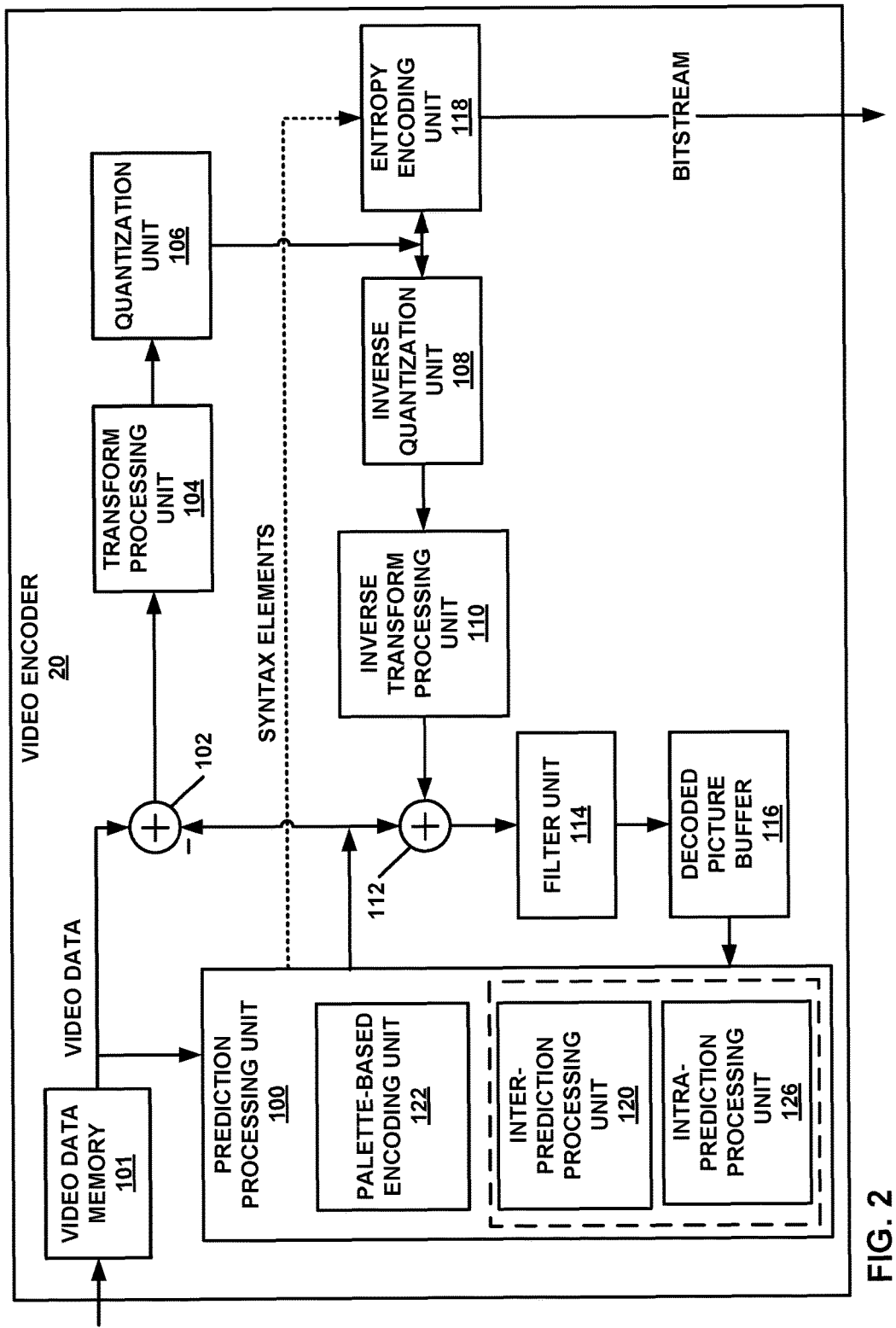
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to code a current block utilizing palette mode, wherein a size of the corresponding chroma block is different than a size of a corresponding luma block.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to a PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described with respect to FIGS. 4-7 below or otherwise described in this disclosure. As one example, palette-based encoding unit 122 may derive a palette table for a current block and store the palette table in video data memory 101. In some cases, palette-based encoding unit 122 may determine that a pixel in the current block of the video data is not be encoded based on the palette table (e.g., the pixel is an escape pixel). In this example, palette-based encoding unit 122 may determine whether the pixel in the current block of the video data includes a luma component and chroma component. For instance, palette-based encoding unit 122 may determine the phase alignment of the luma components and chroma components and determine whether the pixel in the current block includes the luma component and chroma components.

Palette-based encoding unit 122 may determine a number of color values to signal in a bitstream based on the determination of whether the pixel in the current block includes luma components and chroma components, and video encoder 20 may signal color values for the pixels in the bitstream, used for reconstructing the current block, based on the determined number of color values. In this case, the pixel is an escape pixel meaning that the luma and/or chroma values for this pixel are not in the palette. If the luma/chroma values were in the palette, then video encoder 20 would signal a palette index.

As one example, palette-based encoding unit 122 may determine that three color values are to be signaled in the bitstream for an escape pixel based on the determination that the escape pixel in the current block includes the luma components and the chroma components. In this example, video encoder 20 signals three color values for the escape pixel that video decoder 30 uses to reconstruct the current block. As another example, palette-based encoding unit 122 may determine that only a single color value is to be signaled in the bitstream based on the determination that the escape pixel in the current block includes only the luma component and none of the chroma components. In this example, video encoder 20 signals only one color value for the pixel that video decoder 30 uses to reconstruct the escape pixel.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., various directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information; thus quantized transform coefficients may have lower precision than the original transform coefficients before quantization.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
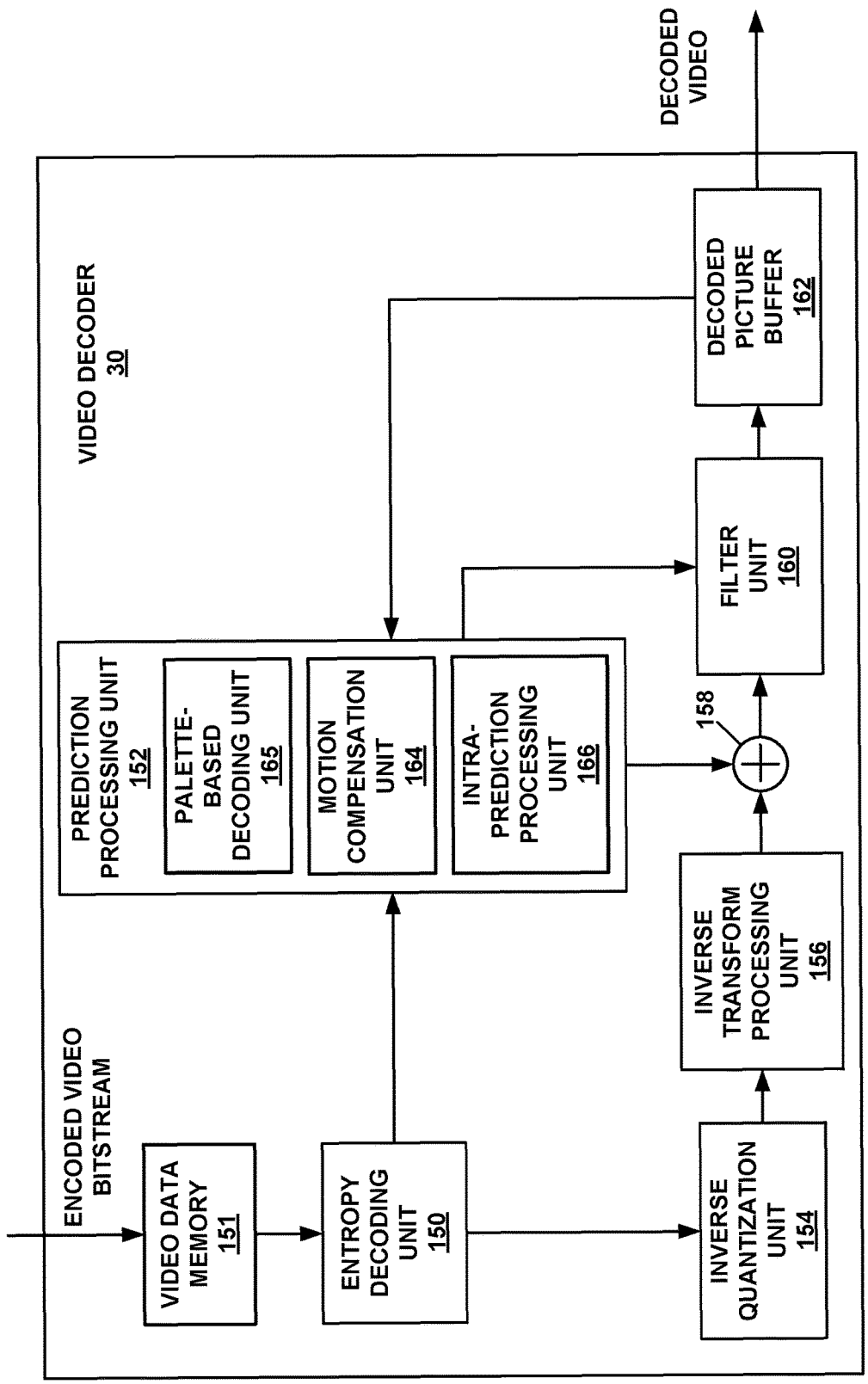
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to code a current block utilizing palette mode, wherein a size of the corresponding chroma block is different than a size of a corresponding luma block.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) in video data memory 151 may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, prediction processing unit 152 decodes the block of video data using a non-palette based coding mode, e.g., such an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

According to aspects of this disclosure, palette-based decoding unit 165 may be configured to perform any combination of the techniques for palette coding described with respect to FIGS. 4-7 below or otherwise described in this disclosure. For example, palette-based decoding unit 165 may derive a single palette table, for a current block of the video data, that includes entries having three color values. Video data memory 151 may store the palette table that includes entries having three color values.

Palette-based decoding unit 165 may determine whether a pixel in the current block of the video data includes a luma component and chroma components. For instance, palette-based decoding unit 165 may determine a phase alignment between luma components of the current block and chroma components of the current block. Palette-based decoding unit 165 may determine whether the pixel in the current block includes the luma component and the chroma components based on the determined phase alignment.

In some examples, palette-based decoding unit 165 may determine a number of color values to retrieve from the palette table based on the determination of whether the pixel in the current block includes the luma component and the chroma components. Palette-based decoding unit 165 determines that three color values are to be retrieved from the palette table based on the determination that the pixel in the current block includes the luma component and the chroma components. Palette-based decoding unit 165 determines that only a single color value of the three colors values is to be retrieved from the palette table based on the determination that the pixel in the current block includes only the luma component and none of the chroma components. In general, video decoder 30 may receive a single index identifying one entry into the palette table. Palette-based decoding unit 165 may determine the number of color values to retrieve from the identified entry into the palette table based on the determination of whether the pixel in the current block includes the luma component and the chroma components.

Palette-based decoding unit 165 may palette-mode decode the pixel in the current block of the video data based on the determination of the number of color values to retrieve. For example, if palette-based decoding unit 165 determines that the pixel includes a luma component and chroma components, palette-based decoding unit 165 may retrieve the three color values from the palette table and assign each of the three color values to respective luma and chroma components of the pixel. If palette-based decoding unit 165 determines that the pixel includes only the luma component and none of the chroma components, palette-based decoding unit 165 may retrieve the single color value from the palette table (e.g., a first identified color value of the three color values) and assign the single color value to the luma component of the pixel.

In the above example, the pixel of the current block was decoded based on color value or values in the palette table. However, in some examples, a pixel in the current block may not be decoded based on the palette table (e.g., an escape pixel). In such examples, palette-based decoding unit 165 may determine whether the escape pixel in the current block includes a luma component and chroma components.

Palette-based decoding unit 165 may determine a number of color values to parse from a bitstream based on the determination of whether the escape pixel in the current block includes the luma component and the chroma component. For example, palette-based decoding unit 165 may determine that three color values (possibly quantized) are to be parsed from the bitstream based on the determination that the escape pixel in the current block includes the luma component and the chroma components. As another example, palette-based decoding unit 165 may determine that only a single color value (possibly quantized) is to be parsed from the bitstream based on the determination that the escape pixel in the current block includes only the luma component and none of the chroma components.

For the escape pixel, palette-based decoding unit 165 may decode the escape pixel based on the determined number of color values to parse from the bitstream. If the escape pixel includes the luma component and the chroma components, palette-based decoding unit 165 may parse three color values (possibly quantized) and assign respective color values to the luma component and the two chroma components. If the escape pixel includes only the luma component and none of the chroma components, palette-based decoding unit 165 may parse only one color value (possibly quantized) and assign that color value to the luma component.

Figure 4:
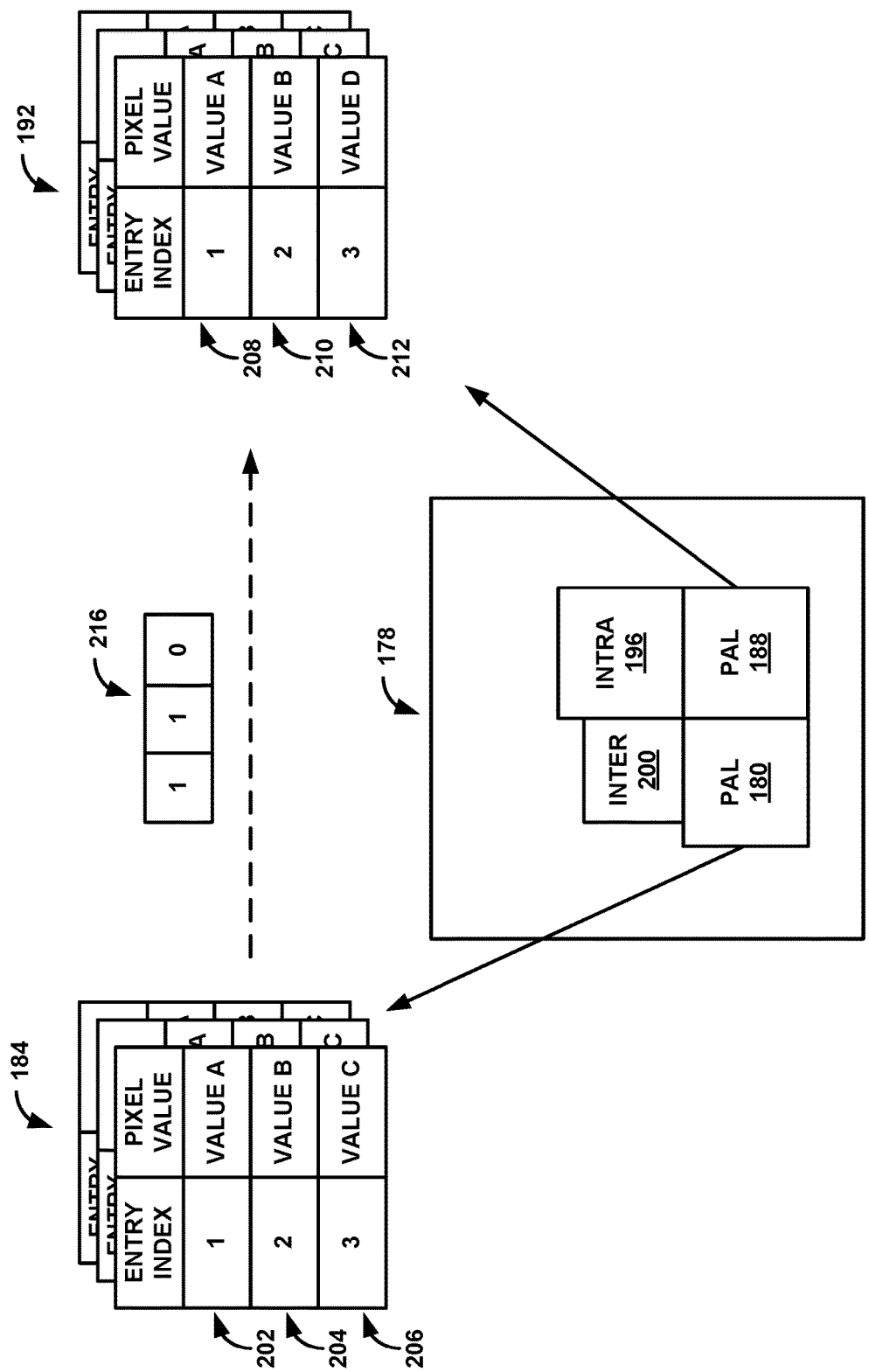
FIG. 4 is a conceptual diagram illustrating an example of determining palette entries for palette-based video coding.

FIG. 4 is a conceptual diagram illustrating an example of determining a palette for coding video data. The example of FIG. 4 includes a picture 178 having a first coding unit (CU) 180 that is associated with first palettes 184 and a second CU 188 that is associated with second palettes 192. First CU 180 and second CU 188 are coded using a palette mode (PAL). As described in greater detail below, second palettes 192 are based on first palettes 184. Picture 178 also includes block 196 coded with an intra-prediction coding mode and block 200 that is coded with an inter-prediction coding mode.

Based on the characteristics of screen content video, palette coding is introduced to improve SCC efficiency firstly proposed in document JCTVC-M0323 ("Palette Mode for Screen Content Coding," L. Guo et al., JCTVC-M0323, Incheon, KR, 18-26 Apr. 2013), the entire content of which is incorporated by reference herein. Specifically, palette coding introduces a lookup table, i.e., color palette, to compress repetitive pixel values based on the fact that in SCC, colors within one CU usually concentrate on a few peak values. Given a palette for a specific CU, pixels within the CU are mapped to the palette index. In the second stage, a copy from left run length technique is proposed to effectively compress the index block's repetitive pattern. In document JCTVC-N0249 ("Non-RCE3: Modified Palette Mode for Screen Content Coding," Guo et al., JCTVC-N0249, Vienna, AT, 25 Jul.-2 Aug. 2013), the palette index coding mode was generalized to permit both copy from left and copy from above with run length coding. Note that, in some instances, no transformation process is invoked for palette coding to avoid blurring sharp edges which has a negative impact on visual quality of screen contents.

In general, the palette is a data structure which stores (index, pixel value) pairs. The designed palette may be decided at video encoder 20, e.g., by the histogram of the pixel values in the current CU. For example, peak values in the histogram are added into the palette, while low frequency pixel values are not included into the palette.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 180 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, each of first palettes 184 include three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, one or more entries of a palette may be predicted from another palette (e.g., a palette previously used during coding). For example, a palette may include entries that are copied from a predictor palette. A predictor palette may include palette entries from blocks previously coded using palette mode or other reconstructed samples. For each entry in the predictor palette, a binary flag may be included in a bitstream to indicate whether that entry is copied to the current palette (indicated by flag=1). A series of binary flags for respective palette entries may be referred to as a binary palette prediction vector. Additionally, the current palette may include new entries signaled explicitly. The number of new entries may also be signaled.

In the example of FIG. 4, video encoder 20 and video decoder 30 may determine second palettes 192 based on first palettes 184. For example, video encoder 20 and/or video decoder 30 may locate one or more blocks from which the predictive palettes, in this example, first palettes 184, are determined. In some examples, such as the example illustrated in FIG. 4, video encoder 20 and/or video decoder 30 may locate the previously coded CU such as a left neighboring CU (first CU 180) when determining a predictive palette for second CU 188.

In the example of FIG. 4, second palettes 192 include three entries 208-212 having entry index value 1, entry index value 2, and entry index value 3, respectively. Entries 208-212 relate the index values to pixel values including pixel value A, pixel value B, and pixel value D, respectively. In this example, video encoder 20 may code one or more syntax elements indicating which entries of first palettes 184 are included in second palettes 192. In the example of FIG. 4, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

FIG. 5 illustrates an example of palette prediction. For example, for SCC, CU blocks within one slice may share many dominant colors. Therefore, as noted above with respect to FIG. 4, it may be possible to predict a current block's palette using a previous palette mode CUs' palettes (in CU decoding order) as reference. Specifically, a 0-1 binary vector may be signaled to indicate whether the pixel values in the reference palette are reused by the current palette or not. As an example, in FIG. 5, it is assumed that the reference palette has 6 items. A vector (1, 0, 1, 1, 1, 1) may be signaled with the current palette which indicates that $v_0$, $v_2$, $v_3$, $v_4$, and $v_5$ are re-used in the current palette while $v_1$ is not re-used. If the current palette contains colors which are not predictable from reference palette, the number of unpredicted colors is coded and then these colors may be directly signaled. For example, in FIG. 5, $u_0$ and $u_1$ may be directly signaled in the bitstream.

Figure 6:
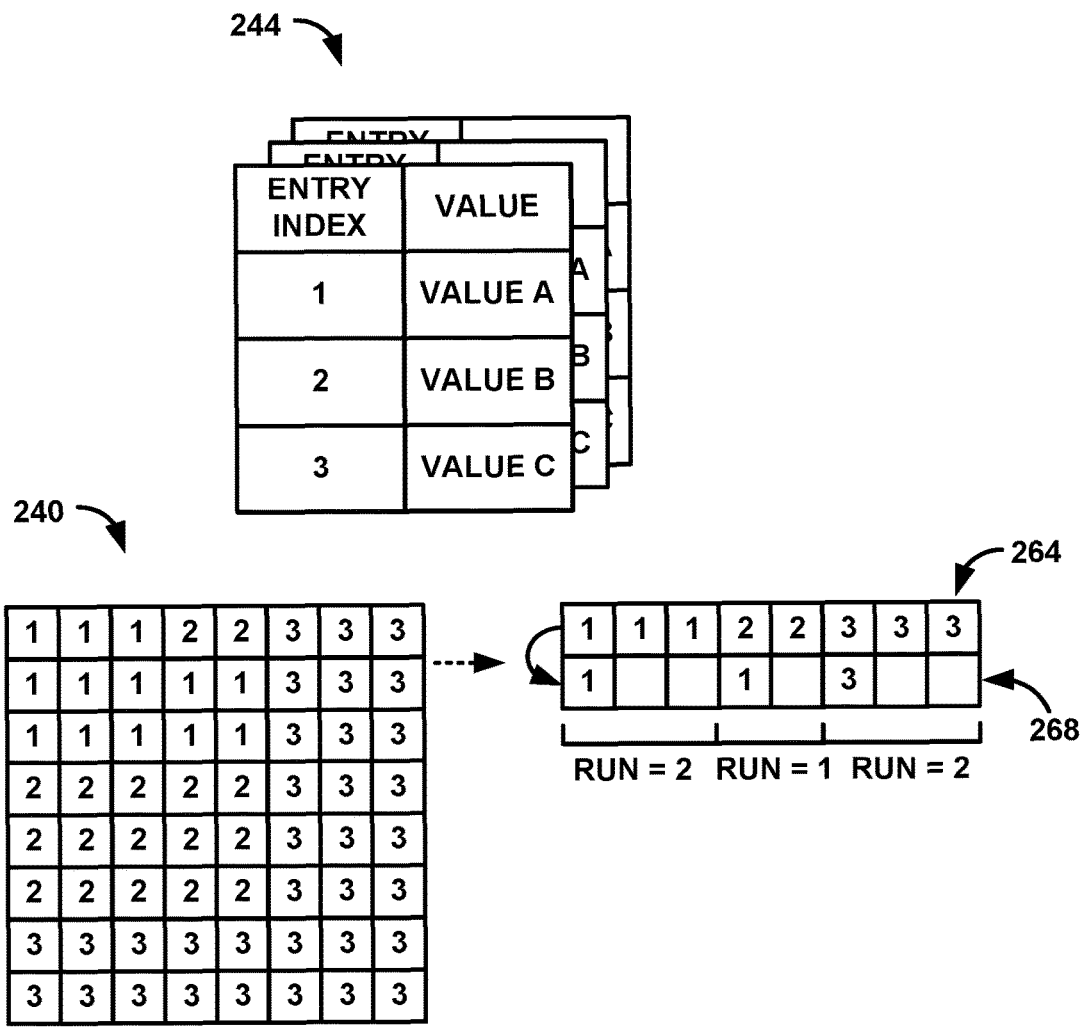
FIG. 6 is a conceptual diagram illustrating an example of determining indices to a palette for a block of pixels.

FIG. 6 is a conceptual diagram illustrating an example of determining indices to a palette for a block of pixels. For example, in the current HEVC Screen Content Coding Test Model 2 (SCM 2) reference software, the two primary aspects of palette coding, from a normative perspective, are the coding of the palette and the coding of the palette index for each sample in the block being coded in the palette mode. As noted above, the coding of palette indices may be performed using two primary modes, including Index mode and Copy from Above mode. In the Index mode, for example, a palette index may be initially signaled. If the index is equal to the size of the palette, this indicates that the sample is an escape sample. In this case, the sample value or quantized samples value for each component are signaled. In the Copy from Above mode, only a non-negative run length value m−1 may be transmitted to indicate that the following m pixels, including the current one, share the palette indexes as their neighbors directly above, respectively.

In some examples, the palette mode for a particular block may be signaled using a palette_mode flag. As noted above, the Index mode is also used to indicate escape samples, i.e., samples that do not belong to the palette. In the current design, a Copy from Above mode is not possible for the first row of the palette block. In addition, a Copy from Above mode may not follow another Copy from Above mode. In these cases, an Index mode is inferred.

In the current design, the palette mode is signaled at a CU level, but it may be possible to signal it at a PU level. A flag_palette_esc_val_present_flag, may also be signaled to indicate the presence of escape samples in a current block. It is also possible to signal palette modes in a different manner. For example, in document JCTVC-P0231 (W. Pu, F. Zou, M. Karczewicz, and R. Joshi, "Non-RCE4: Refinement of the palette in RCE4 Test 2," JCTVC-P0231), it was proposed to use an explicit flag to indicate whether the current sample was an escape sample. If the current sample was non-escape, another flag was signaled to indicate whether the palette mode was Copy from Above or Index mode.

The example of FIG. 6 includes a map 240 of index values (values 1, 2, and 3) that relate respective positions of pixels associated with the index values to an entry of palettes 244. While map 240 is illustrated in the example of FIG. 6 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. Video encoder 20 may, in such an example, also encode a palette index (shown in the example of FIG. 6 as values 1-3) to indicate a corresponding pixel value in the palette and to allow video decoder 30 to reconstruct the pixel value.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that are coded as a group. The so-called "string" of values may be referred to as a run having a run length. For example, a run in the Index mode may indicate a string of pixels having the same index value. In another example, a run length in the Copy from Above mode may indicate a string of pixel values that share the same value as the above-neighboring pixels. Video decoder 30 may obtain the syntax elements indicating a run from an encoded bitstream and use the data to determine the number of consecutive locations that are coded together.

As noted above, runs may be used in conjunction with a Copy Top (also referred to as Copy from Above) or Copy Left mode (also referred to as index mode). In an example for purposes of illustration, consider rows 264 and 268 of map 240. Assuming a horizontal, left to right scan direction, row 264 includes three index values of "1," two index values of "2," and three index values of "3." Row 268 includes five index values of "1" and three index values of "3." In this example, video encoder 20 may identify particular entries of row 264 followed by a run when encoding data for row 268 (e.g., Copy Top mode). For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

After encoding the one or more syntax elements indicating the first position of row 264 and the run of two entries (noted above), video encoder 20 may encode, for the fourth and fifth positions in line 268 (from left to right), one or more syntax elements indicating a value of 1 for the fourth position and one or more syntax elements indicating a run of 1 (e.g., Copy Left mode). Hence, video encoder 20 encodes these two positions without reference to another line. In some examples, Copy Left mode may also be referred to as "Value" mode.

Video encoder 20 may then encode the first position having an index value of 3 in row 268 relative to upper row 264 (e.g., indicating a copy from upper row 264 and the run of consecutive positions in the scan order having the same index value). Accordingly, video encoder 20 may select between coding pixel or index values of a line relative to other values of the line, e.g., using a run, coding pixel or index values of a line relative to values of another line (or column), or a combination thereof. Video encoder 20 may, in some examples, perform a rate/distortion optimization to make the selection.

Video decoder 30 may receive the syntax elements described above and reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order being processed as a group, e.g., in a run having a run length. While described with respect to a horizontal scan order, the techniques of this disclosure may also be applied to another scan direction, such as a vertical or diagonal (e.g., 45 degrees or 135 degrees diagonally in block) scan direction.

Figure 7:
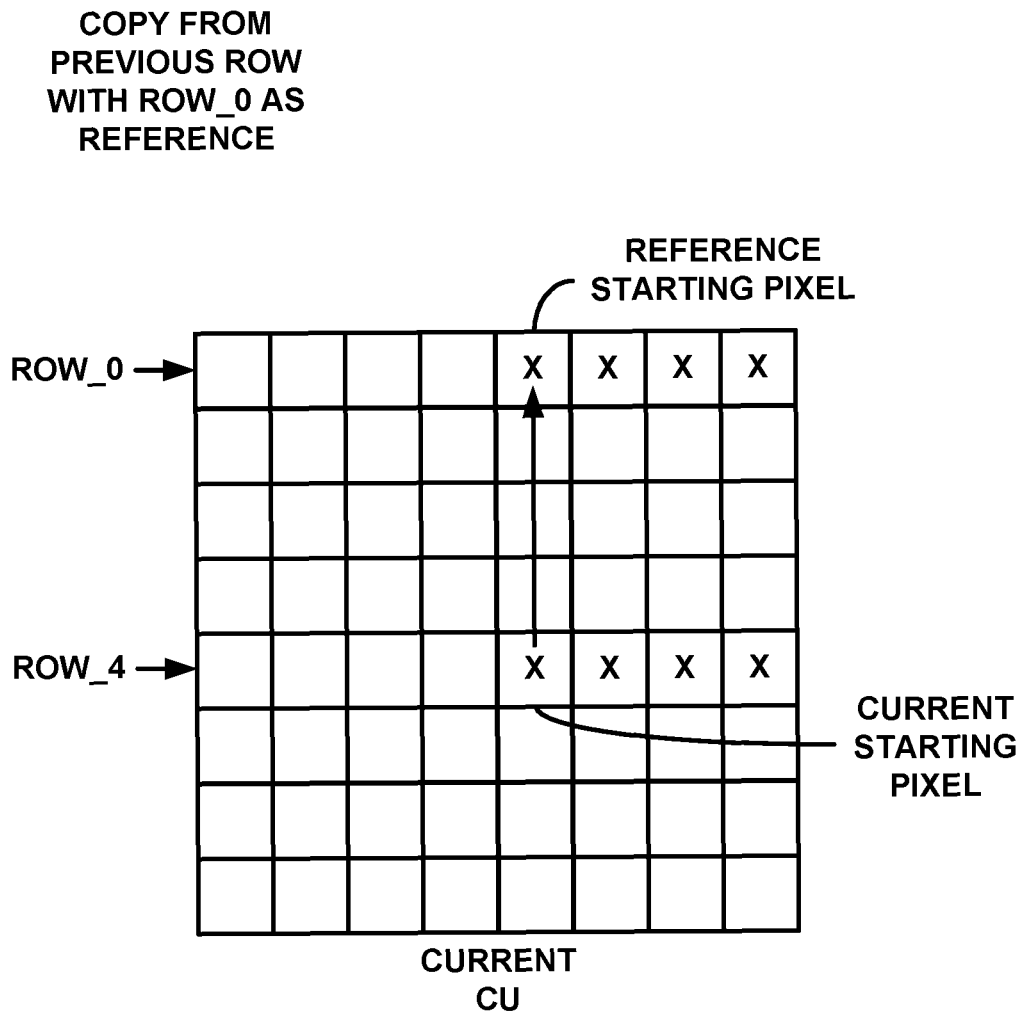
FIG. 7 is a conceptual diagram illustrating an example of copying palette indices from a previously coded row.

FIG. 7 is a conceptual diagram illustrating an example of copying palette indices from a previously coded row. The example of FIG. 7 may generally illustrate a Copy Previous Row mode. For example, as noted above, the Copy Previous Row mode may operate similarly to the Copy From Above mode; however, the row from which indices are copied may be explicitly signaled. The Copy Previous Row mode may enable pixels values to be copied from previously coded rows beyond the row directly above the pixels currently being coded.

For example, to achieve a better coding efficiency, the Copy Previous Row mode allows any previously coded row to be used as a reference. The Copy Previous Row mode may be added in the available palette mode candidate list. The row index information may be coded when the Copy Previous Row mode is selected. The row index may be coded using a truncated binary codeword. A shorter codeword may be designated for rows that are positioned closer to the current row. As with other palette modes, the matching length (e.g., a run length of positions being coded together) may be coded in the bitstream. To reduce redundancy with the Copy from Above mode, the Copy Previous Mode may be valid starting from the third row of the current CU.

In U.S. Provisional Application No. 62/015,177, filed Jun. 20, 2014 ("the 177 provisional) and U.S. Provisional Application No. 62/018,477, filed Jun. 27, 2014 ("the 477 provisional), as well as document JCTVC-R0202 (F. Zou, M. Karczewicz, R. Joshi, and J. Sole, "Non-SCCE3: Copy from previous row mode for palette coding", JCTVC-R0202), several aspects of the Copy Previous Row (also referred to as "Copy from Previous Row") were proposed, including but not limited to the mode coding/signaling techniques that may be used to represent "index," "copy from above," and "copy previous row" modes. In some examples, truncated unary coding may be used for these three modes. In such examples, a maximum symbol value may be reduced when some of the modes are not available, thus reducing the overhead cost.

Figure 10:
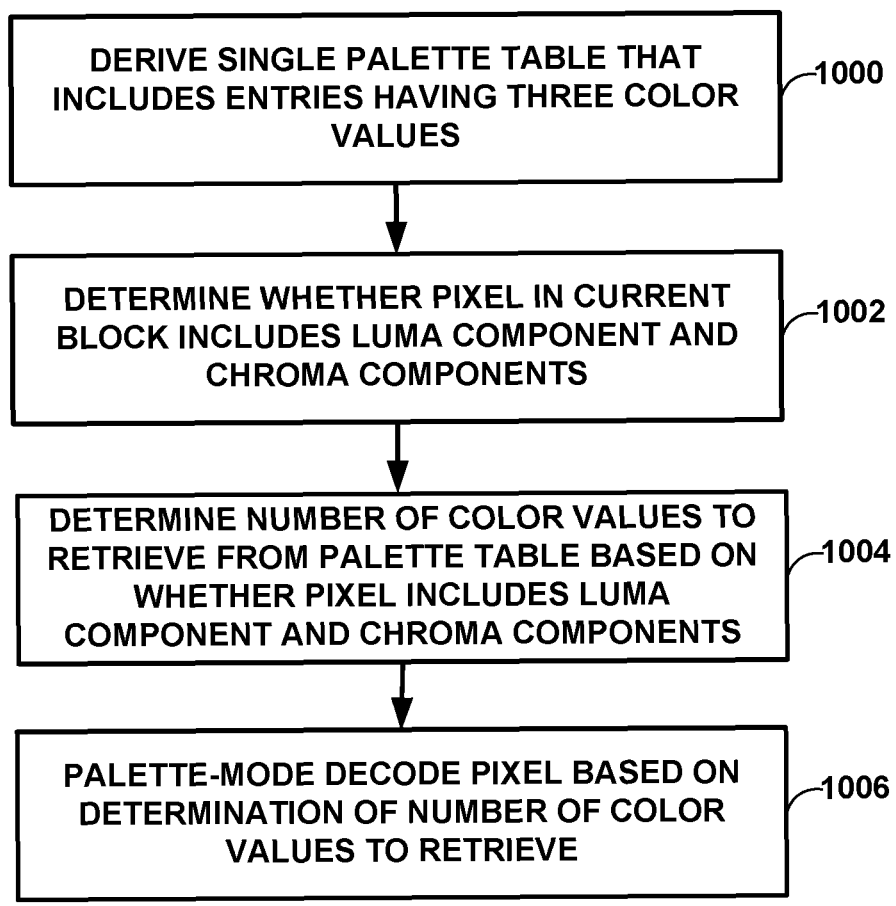
FIG. 10 is a flowchart illustrating an example of decoding video data.

FIG. 10 is a flowchart illustrating an example of decoding video data. Video decoder 30 may derive a single palette table, for a current block of the video data, that includes entries having three color values (1000). Video data memory 151 may store the palette table.

Video decoder 30 may determine whether a pixel in the current block of the video data includes a luma component and chroma components (1002). For example, video decoder 30 may determine a phase alignment between luma components of the current block and chroma components of the current block. Video decoder 30 may determine whether the pixel in the current block includes the luma component and the chroma components based on the determined phase alignment.

Video decoder 30 may determine a number of color values to retrieve from the palette table based on the determination of whether the pixel in the current block includes the luma component and the chroma components (1004). Video decoder 30 may palette-mode decode the pixel in the current block of the video data based on the determination of the number of color values to retrieve (1006).

For example, video decoder 30 may receive a single index identifying one entry into the palette table. In this example, video decoder 30 may determine the number of color values to retrieve from the identified entry into the palette table based on the determination of whether the pixel in the current block includes the luma component and the chroma components.

In one example, video decoder 30 may determine that three color values are to be retrieved from the palette table based on the determination that the pixel in current block includes the luma component and the chroma components. In this example, to palette-mode decode the pixel, video decoder 30 may retrieve the three color values from the palette table and assign each of the three color values to respective luma and chroma components of the pixel.

In another example, video decoder 30 may determine that only a single color value of the three color values is to be retrieved from the palette table based on the determination that the pixel in current block includes only the luma component and none of the chroma components. In this example, to palette-mode decode the pixel, video decoder 30 may retrieve the single color value from the palette table and assign the single color value to the luma component of the pixel. For instance, the single color value may be a first identified color values of the three color values stored in the palette table.

In the above example illustrated in FIG. 10, the pixel of the current block may be considered as a first pixel. In some examples, video decoder 30 may determine that a second pixel in the current block is not to be decoded based on the palette table (e.g., the second pixel is an escape pixel). Video decoder 30 may determine whether the second pixel in the current block includes a luma component and chroma components, and determine a number of color values to parse from a bitstream based on the determination of whether the second pixel in the current block includes the luma component and the chroma components. The color values may possibly be quantized, and in the following description, although not explicitly stated, it should be assumed that the color values may possibly be quantized. However, the color values need not necessarily always be quantized.

Video decoder 30 may decode the second pixel in the current block based on the determined number of color values to parse from the bitstream. Video decoder 30 determines that three color values are to be parsed from the bitstream based on the determination that the second pixel in the current block includes the luma component and the chroma components, and video decoder 30 determines that only a single color value is to be parsed from the bitstream based on the determination that the second pixel in the current block includes only the luma component and none of the chroma components.

Figure 11:
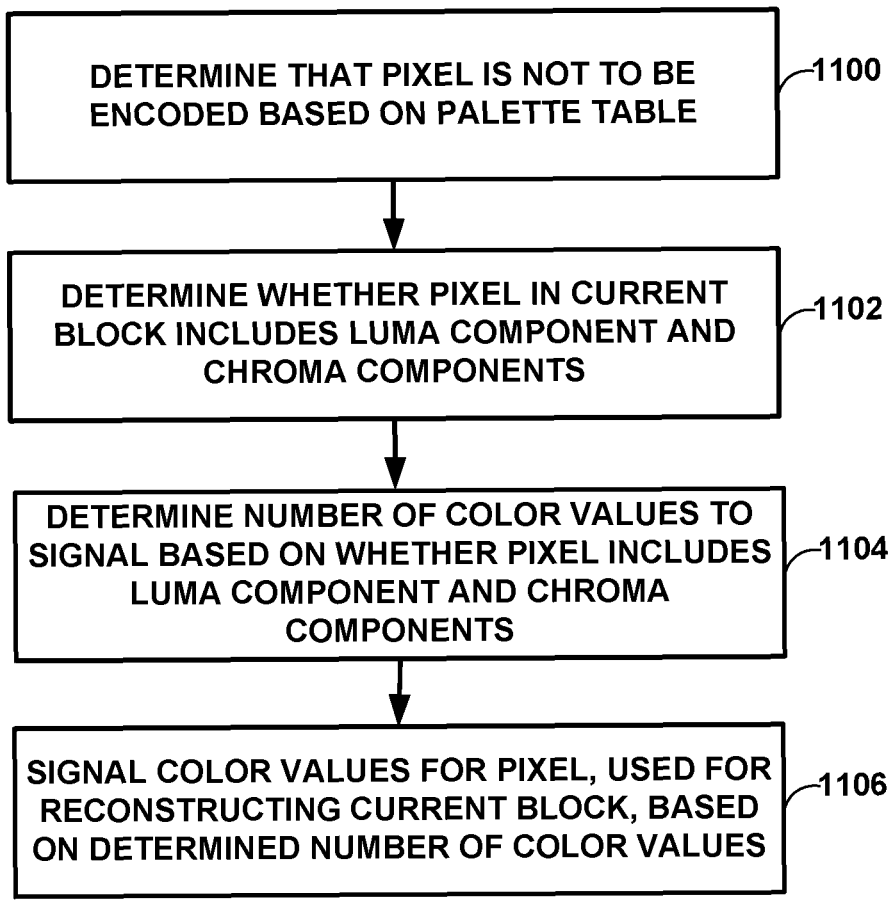
FIG. 11 is a flowchart illustrating an example of encoding video data.

FIG. 11 is a flowchart illustrating an example of encoding video data. Video encoder 20 may determine that a pixel in a current block of the video data is not to be encoded based on a palette table that is stored in video data memory 101 (e.g., escape pixel) (1100). Video encoder 20 may determine whether the pixel in the current block of the video data includes a luma component and chroma components (1102), and may determine a number of color values to signal in a bitstream based on the determination of whether the pixel in the current block includes the luma component and the chroma components (1104). Video encoder 20 may signal color values for the pixel in the bitstream, used for reconstructing the current block, based on the determined number of color values (1106).

As one example, to determine the number of color values to signal in the bitstream, video encoder 20 may determine that three color values are to be signaled in the bitstream based on the determination that the pixel in the current block includes the luma component and the chroma components. To signal color values, video encoder 20 may signal three color values for the pixel that video decoder 30 uses to reconstruct the current block.

As another example, to determine the number of color values to signal in the bitstream, video encoder 20 may determine that only a single color value is to be signaled in the bitstream based on the determination that the pixel in the current block includes only the luma component and none of the chroma components. To signal, video encoder 20 may signal only one color value for the pixel that video decoder 30 uses to reconstruct the current block.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable. In addition, video encoding and video decoding may be generically referred to as "processing" video data.

It should be understood that all of the techniques described herein may be used individually or in combination. This disclosure includes several signaling methods which may change depending on certain factors such as block size, palette size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    deriving a single palette table, for a current block of the video data, that includes entries having three color values;
    determining whether a pixel in a current block of the video data includes a luma component and chroma components;
    determining that only a single color value of the three color values is to be retrieved from the single palette table based on a determination that the pixel in the current block includes only the luma component and none of the chroma components; and
    palette-mode decoding the pixel in the current block of the video data by retrieving the single color value from the single palette table and assigning the single color value to the luma component of the pixel.

2. The method of claim 1, further comprising:
    determining a phase alignment between luma components of the current block and chroma components of the current block,
    wherein determining whether the pixel in the current block includes the luma component and the chroma components comprises determining whether the pixel in the current block includes the luma component and the chroma components based on the determined phase alignment.

3. The method of claim 1, further comprising determining a second number of color values to retrieve from a second single palette table based on a determination of whether a pixel in a second block of the video data includes a luma component and chroma components, wherein determining the second number of color values comprises determining that three color values are to be retrieved from the second single palette table based on a determination that the pixel in the second block includes the luma component and the chroma components, and wherein palette-mode decoding the pixel in the second block comprises retrieving the three color values from the second single palette table and assigning each of the three color values to respective luma and chroma components of the pixel in the second block.

4. The method of claim 1, wherein the single color value comprises a first identified color value of the three color values.

5. The method of claim 1, wherein the pixel comprises a first pixel, the method further comprising:
    determining that a second pixel in the current block is not to be decoded based on the single palette table;
    determining whether the second pixel in the current block includes a luma component and chroma components;
    determining a number of color values to parse from a bitstream based on the determination of whether the second pixel in the current block includes the luma component and the chroma components; and
    decoding the second pixel in the current block based on the determined number of color values to parse from the bitstream.

6. The method of claim 5, wherein determining the number of color values to parse from the bitstream comprises determining that three color values are to be parsed from the bitstream based on a determination that the second pixel in the current block includes the luma component and the chroma components.

7. The method of claim 5, wherein determining the number of color values to parse from the bitstream comprises determining that only a single color value is to be parsed from the bitstream based on a determination that the second pixel in the current block includes only the luma component and none of the chroma components.

8. The method of claim 1, further comprising:
receiving a single index identifying one entry in the single palette table,
wherein determining that only the single color value of the three color values is to be retrieved from the single palette table comprises determining a number of color values to retrieve from the identified entry in the single palette table based on the determination of whether the pixel in the current block includes the luma component and the chroma components.

9. A device for decoding video data, the device comprising:
a memory unit configured to store a palette table, for a current block of the video data, that includes entries having three color values; and
a video decoder configured to:
derive the palette table for the current block of the video data, and no other palette table for the current block, for storage in the memory unit;
determine whether a pixel in the current block of the video data includes a luma component and chroma components;
determine that only a single color value of the three color values is to be retrieved from the single palette table based on a determination that the pixel in the current block includes only the luma component and none of the chroma components; and
palette-mode decode the pixel in the current block of the video data by retrieving the single color value from the single palette table and assigning the single color value to the luma component of the pixel.

10. The device of claim 9, wherein the video decoder is configured to:
determine a phase alignment between luma components of the current block and chroma components of the current block,
wherein to determine whether the pixel in the current block includes the luma component and the chroma components, the video decoder is configured to determine whether the pixel in the current block includes the luma component and the chroma components based on the determined phase alignment.

11. The device of claim 9, wherein the video decoder is configured to:
determine a number of color values by determining that three color values are to be retrieved from the palette table based on a determination that the pixel in the current block includes the luma component and the chroma components; and
palette-mode decode the pixel in the current block by retrieving the three color values from the palette table and assigning each of the three color values to respective luma and chroma components of the pixel.

12. The device of claim 9, wherein the single color value comprises a first identified color value of the three color values.

13. The device of claim 9, wherein the pixel comprises a first pixel, and wherein the video decoder is configured to:
determine that a second pixel in the current block is not to be decoded based on the palette table;
determine whether the second pixel in the current block includes a luma component and chroma components;
determine a number of color values to parse from a bitstream based on the determination of whether the second pixel in the current block includes the luma component and the chroma components; and
decode the second pixel in the current block based on the determined number of color values to parse from the bitstream.

14. The device of claim 13, wherein to determine the number of color values to parse from the bitstream, the video decoder is configured to determine that three color values are to be parsed from the bitstream based on a determination that the second pixel in the current block includes the luma component and the chroma components.

15. The device of claim 13, wherein to determine the number of color values to parse from the bitstream, the video decoder is configured to determine that only a single color value is to be parsed from the bitstream based on a determination that the second pixel in the current block includes only the luma component and none of the chroma components.

16. The device of claim 9, wherein the video decoder is configured to:
receive a single index identifying one entry in the palette table,
wherein to determine that only the single color value of the three color values is to be retrieved from the single palette table comprises determining the number of color values to retrieve from the identified entry in the palette table based on the determination of whether the pixel in the current block includes the luma component and the chroma components.

17. The device of claim 9, wherein the device comprises at least one of a microprocessor, an integrated circuit, a wireless communication device, or a display configured to display a picture that includes the current block.

18. A non-transitory computer-readable storage medium having instructions stored thereon that when executed cause one or more processors of a device for decoding video data to:
derive a single palette table, for a current block of the video data, that includes entries having three color values;
determine whether a pixel in the current block of the video data includes a luma component and chroma components;
determine that only a single color value of the three color values is to be retrieved from the single palette table based on a determination that the pixel in the current block includes only the luma component and none of the chroma components; and
palette-mode decode the pixel in the current block of the video data by retrieving the single color value from the single palette table and assigning the single color value to the luma component of the pixel.

19. The non-transitory computer-readable storage medium of claim 18, further comprising instructions that cause the one or more processors to:
determine a phase alignment between luma components of the current block and chroma components of the current block,
wherein the instructions that cause the one or more processors to determine whether the pixel in the current block includes the luma component and the chroma components comprise instructions that cause the one or more processors to determine whether the pixel in the current block includes the luma component and the chroma components based on the determined phase alignment.

20. The non-transitory computer-readable storage medium of claim 18, further comprising instructions that cause the one or more processors to:
   determine a number of color values by determining that three color values are to be retrieved from the single palette table based on a determination that the pixel in the current block includes the luma component and the chroma components; and
   palette-mode decode the pixel in the current block by retrieving the three color values from the single palette table and assigning each of the three color values to respective luma and chroma components of the pixel.

21. A device for decoding video data, the device comprising:
   means for deriving a single palette table, for a current block of the video data, that includes entries having three color values;
   means for determining whether a pixel in a current block of the video data includes a luma component and chroma components;
   means for determining that only a single color value of the three color values is to be retrieved from the single palette table based on a determination that the pixel in the current block includes only the luma component and none of the chroma components; and
   means for palette-mode decoding the pixel in the current block of the video data by retrieving the single color value from the single palette table and assigning the single color value to the luma component of the pixel.

22. The device of claim 21, further comprising:
   means for determining a phase alignment between luma components of the current block and chroma components of the current block,
   wherein the means for determining whether the pixel in the current block includes the luma component and the chroma components comprises means for determining whether the pixel in the current block includes the luma component and the chroma components based on the determined phase alignment.

23. The device of claim 21, further comprising:
   means for determining a number of color values by determining that three color values are to be retrieved from the single palette table based on a determination that the pixel in the current block includes the luma component and the chroma components; and
   means for palette-mode decoding the pixel in the current block by retrieving the three color values from the single palette table; and
   means for assigning each of the three color values to respective luma and chroma components of the pixel.

24. A method of encoding video data, the method comprising:
   determining that a pixel in a current block of the video data is not to be encoded based on a single palette table;
   determining whether the pixel in the current block of the video data includes a luma component and chroma components;
   determining that only a single color value is to be signaled in a bitstream based on a determination that the pixel in the current block includes only the luma component and none of the chroma components; and
   signaling color values for the pixel in the bitstream, used for reconstructing the current block, by signaling only one color value for the pixel.

25. The method of claim 24, further comprising determining a second number of color values to signal in the bitstream based on a determination of whether a pixel in a second block of the video data includes a luma component and chroma components, wherein determining the second number of color values comprises determining that three color values are to be signaled in the bitstream based on a determination that the pixel in the second block includes the luma component and the chroma components, and wherein signaling color values comprises signaling three color values for the pixel in the second block.

26. The method of claim 24, wherein signaling color values comprises signaling quantized color values.

27. A device for encoding video data, the device comprising:
   a memory unit configured to store a palette table, for a current block of the video data; and
   a video encoder configured to:
      determine that a pixel in the current block of the video data is not to be encoded based on the palette table;
      determine whether the pixel in the current block of the video data includes a luma component and chroma components;
      determine a that only a single color value is to be signaled in a bitstream based on a determination that the pixel in the current block includes only the luma component and none of the chroma components; and
      signal color values for the pixel in the bitstream, used for reconstructing the current block, by signaling only one color value for the pixel.

28. The device of claim 27, wherein the video encoder is configured to:
   determine a number of color values to signal in the bitstream by determining that three color values are to be signaled in the bitstream based on a determination that the pixel in the current block includes the luma component and the chroma components; and
   signal three color values for the pixel.

29. The device of claim 27, wherein to signal color values, the video encoder is configured to signal quantized color values.

30. The device of claim 27, wherein the device comprises at least one of a microprocessor, an integrated circuit, a wireless communication device, or a camera configured to capture a picture that includes the current block.

* * * * *